United States Patent [19]

Masler

[11] Patent Number: 4,646,932

[45] Date of Patent: Mar. 3, 1987

[54] OPENING STOPPER FOR AUTOMOTIVE VEHICLE BODIES

[75] Inventor: Gerhard Masler, Hemdingen, Fed. Rep. of Germany

[73] Assignee: ITW Ataco GmbH, Norderstedt, Fed. Rep. of Germany

[21] Appl. No.: 848,355

[22] Filed: Apr. 4, 1986

[30] Foreign Application Priority Data

Apr. 6, 1985 [DE] Fed. Rep. of Germany ....... 3512582

[51] Int. Cl.⁴ .............................................. B65D 39/00
[52] U.S. Cl. ............................ 220/307; 220/DIG. 19
[58] Field of Search ....................... 220/307, DIG. 19

[56] References Cited

U.S. PATENT DOCUMENTS 4,393,929  7/1983  Ball et al. .................... 220/DIG. 19
4,399,927  8/1983  Yaotani et al. ...................... 220/307
4,544,074  10/1985  Evans .................................. 220/307

Primary Examiner—George T. Hall
Attorney, Agent, or Firm—A. J. Brunett; T. W. Buckman

[57] ABSTRACT

An opening stopper of elastomeric material, especially for sealing lacquer outflow openings in automotive vehicle bodies, comprising a closed bottom, an elastically shapable flange covering the edge of the workpiece opening, a collar connecting the bottom to the flange, and a shoulder disposed at the outer surface of the collar, said shoulder engaging behind the oppositely disposed opening edge, wherein the shoulder is formed by a circumferentially extending free edge of a lip configurated like a conical disc which is tied at a location level with the countersunk bottom and extends obliquely outward towards the flange.

4 Claims, 4 Drawing Figures

OPENING STOPPER FOR AUTOMOTIVE VEHICLE BODIES

The invention relates to an opening stopper of elastomeric material, especially for sealing lacquer outflow openings in automotive vehicle bodies, comprising a closed bottom, an elastically deformable flange covering the edge of the workpiece opening, a collar connecting the bottom to the flange, and a shoulder arranged on the outside of the collar gripping behind the oppositely disposed opening edge.

Such an opening stopper is known (German Utility Model No. 81 29 409). The collar is V-shaped in cross section and the flange is tied to the outside portion of the collar. An annular circumferentially extending oblique shoulder is formed integrally with the outer surface of the outside collar portion. With the aid of such an opening stopper a mechanical tight fit is obtained which guarantees a sufficient sealing effect.

The bottom of the known opening stopper is disposed about level with the flange, so that a pocket is formed on the other side of the workpiece. After flooding and draining again the liquid wax for the purpose of sealing parts of the body, wax may collect in this pocket which will then no more be available for further use. Another disadvantage of the known opening stopper resides in that the insertion requires a relatively high amount of power. So that the shoulder may grip behind the opening edge, the outer collar portion must be sufficiently deformed radially.

It has also become known to shape an opening stopper of a mixture of thermoplastic elastomers, with one elastomer taking over the function of a fusion type adhesive and taking care of a sufficient adhesive connection to the carrier workpiece. The temperature-resistant elastomer remains dimensionally stable and thus retains the shape of the opening stopper (German disclosure letter No. 31 42 850). Such an opening stopper provides for an especiallly effective sealing even with substantial opening tolerances, however, is relatively costly with a view to the materials to be used.

It is the object of the invention to provide an opening stopper of elastomeric material, especially for sealing lacquer outflow openings in the bodies of automotive vehicles, said stopper consisting of a material which is favourable from a cost point of view, while being easily mountable and reducing the consumption of sealing material.

The above object is attained in accordance with the invention in that the shoulder is formed by the circumferentially extending free edge of a lip shaped like a conical disc which is tied at a location level with the countersunk bottom and extends obliquely outward towards the flange.

With the opening stopper according to the invention the bottom is disposed in countersunk arrangement. In this manner, the opening stopper does not form a pocket on the "inside surface" of the workpiece, but forms an elevation. When the liquid wax is being filled in, therefore, no accumulation can form in the region of the opening stopper.

The lip in the shape of a conical disc the free edge of which comes to lie in close contact against the other side of the opening edge, may readily be deformed upon insertion of the opening stopper. Major forces of impression are, therefore, not necessary. But the lip takes never-the-less care of a sufficient circumferentially extending sealing at the workpiece, even with substantial opening tolerances and deviations from the circular shape. Even unevennesses in the region of the opening in the plane of the workpiece may readily be levelled. Owing to the fact that the lip is tied in the bottom region, a pressure on the bottom will cause a tensional effect in the collar and in the sealing lip, wherein the insertion is particularly facilitated.

According to one embodiment of the invention, the flange is circularly arcuate in cross section such that only the outer edge thereof comes to lie in close contact against the opening edge. The flange in this manner is effective like a plate spring and takes care of a sufficient bias for positioning in close contact against the workpiece, and the positioning of the sealing lip, respectively, at the opposite side in close contact. Such a shape of flange, however, is known per se.

Another embodiment of the invention takes care that the collar enlarges conically from the bottom to the flange. Thereby, it is made possible for the collar to come to lie in close contact against the opening wall. This positioning in close contact, on the one hand, increases the sealing effect and, on the other hand, prevents the stopper from moving within the opening due to the opening tolerances. Another embodiment of the invention provides for the bottom to have a central vault. Such a vault is a reinforcement of the bottom in the manner of a bead which is useful, in particular, during insertion of the stopper.

The opening stopper in accordance with the invention is not in need of any adhesive connection to the workpiece. But it goes without saying that the invention is not restricted to opening stoppers to be fastened without adhesive. Rather, it may consist of a plastics mixture, for instance, one component of which having properties of a fusion type adhesive at the temperatures occurring.

The invention will be described in the following in more detail by way of drawings. FIG. 1 shows a sectional view of an opening stopper according to the invention.

Figure 1:
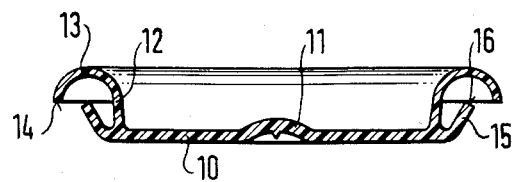

Prior to enlarging in more detail on the individual representations shown in the drawings, it is stated that each of the features described is of inventively essential significance by itself and in connection with features of the claims.

The opening stopper shown in the drawings comprises a smooth circularly shaped bottom 10 which is provided with a small vault 11 in the center thereof. A conical collar 12 is formed at the edge of the bottom and merges at the other end in a flange 13 which is circularly arcuate in cross section. The circularly arcuate flange 13 has a free circularly circumferentially extending edge 14. A sealing lip 15 shaped like a conical disc is formed integrally with the bottom 10 at the outer edge thereof, said lip extending obliquely upward in a direction toward the flange 13. It has a free circumferentially extending edge 16. The edge 14 of the flange 13 and the edge 16 of the sealing lip 15 are disposed approximately in the same plane (see FIG. 1).

Figure 2:
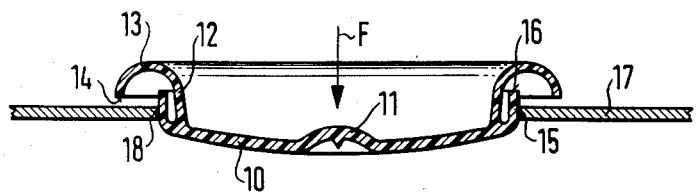
FIG. 2 shows the opening stopper according to FIG. 1 during insertion thereof into a workpiece opening.
Figure 3:
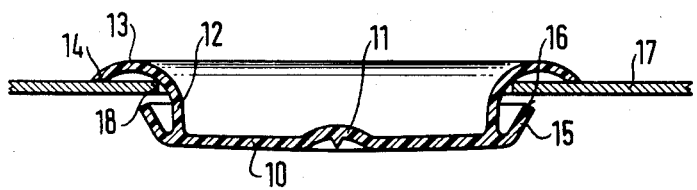
FIG. 3 shows the end phase of the process of insertion of the opening stopper according to FIG. 1.
Figure 4:
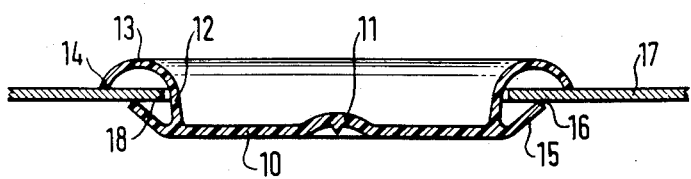
FIG. 4 shows the opening stopper according to FIG. 1 in the inserted condition.

In FIGS. 2 to 4 a sheet metal member 17 is shown in cross section with an opening 18 formed therein. For insertion of the opening stopper according to FIG. 1 into the opening 18 a pressure is exerted on the bottom 10 in the direction of the arrow F, so that it becomes slightly vaulted downwardly. The countersunk arrangement of the bottom 10 with respect to the flange 13 results in the collar 12 and the sealing lip 15 being drawn into the opening 18. The sealing lip 15 is deformed upward and inward in this operation (see FIG. 2) until it may relax again after having passed through the opening 18 (see FIG. 3). For this purpose the vaulted flange 13 is temporarily brought into a flatter shape. After termination of the pressure the flange may in part relax. The edge 16 of the sealing lip 15, however, comes to lie in close contact against the other side of the workpiece under the residual tension, so that a sealing contact is established on oppositely disposed sides of the sheet metal member 17. The conical collar 12 in this operation comes to lie in close contact against the opening wall and prevents displacement of the opening stopper.

It may be recognized from FIG. 4 that the opening stopper forms an elevation on the other side of the sheet metal member 17 (in a direction opposite to the direction of impression) and thus does not allow of any possibility for the liquid wax or the like to accumulate.

I claim:

1. A one-piece stopper for insertion into an opening formed in a panel and preventing the outflow of liquid from the interior of the panel comprising:
   a flange portion for pressed contact with the exterior surface of the panel;
   a collar portion integrally formed and extending away from the lower surface of said flange portion having a closed bottom and adapted for insertion into the opening in the panel; and
   a shoulder portion for pressed contact with the interior surface of the panel integrally formed with said collar portion on its end opposite said flange portion having a circumferentially extending conical shaped free edge extending back toward said flange portion.

2. The stopper of claim 1, wherein said flange portion is circularly arcuate in cross section so that only its outer edge contacts the exterior surface of the panel.

3. The stopper of claim 1, wherein said collar portion conically enlarges as it extends away from said flange portion.

4. The stopper of claim 1, wherein said closed bottom further comprises a central vault.

* * * * *